No. 759,800.

Patented May 10, 1904.

UNITED STATES PATENT OFFICE.

HENRY F. BOCKMEYER, OF PHILADELPHIA, PENNSYLVANIA, ASSIGNOR TO A. O. GRANGER, OF CARTERSVILLE, GEORGIA.

PROCESS OF TREATING COTTON-SEED HULLS OR COTTON-WASTE.

SPECIFICATION forming part of Letters Patent No. 759,800, dated May 10, 1904.

Application filed August 20, 1903. Serial No. 170,131. (No specimens.)

*To all whom it may concern:*

Be it known that I, HENRY F. BOCKMEYER, a citizen of the United States, residing in Philadelphia, in the county of Philadelphia and State of Pennsylvania, have invented certain new and useful Improvements in Processes of Treating Cotton-Seed Hulls or Cotton-Waste, of which the following is a specification.

By subjection to the present process of treatment cotton-seed hulls, cotton-waste, and other vegetable fiber may be decolorized and otherwise rendered fit for various uses and applications in the arts.

The strengths of the solutions to which the material is subjected and which is given hereinafter in the detailed description of the process are particularly adapted for the treatment of cotton-seed hulls, and the various steps involved in the present improvements is therefore to be understood, with respect to composition of the solutions used, as applying to the employment of cotton-seed hulls for a raw material.

In carrying the present process into practical effect the hulls after having been ground by suitable means (and if other vegetable material is used this likewise being reduced to a comminuted condition) are subjected in a proper receptacle to the action of an alkali. This alkali may be in solution, for the making of which commercial sodium or potassium hydrate may be used. This solution is preferably a one or two per cent. solution approximately, and I prefer to pass live steam into the mixture from one or two hours, as may be found necessary. The alkali serves not only to cleanse the waste, but to saponify and remove the oily matters that may be present, and tends to loosen (break down) the intimate structure of the seed-shell particles disseminated as a result of the grinding operation throughout the mass. In this loosened condition such particles more readily and effectively undergo the subsequent decolorizing or bleaching process. If it is desired before passing to the next step to remove the oily matters, dirt, &c., taken up or rendered soluble by the alkali, the solution is then drawn off and the mass washed with water. The washed hulls, &c., are now again mixed with a one-per-cent. alkaline solution approximately, which may, as before, be made from sodium or potassium hydrate. The presence of this free alkali tends to prevent the contraction of the shell structure and the collapse of the fiber tube of the cotton. Chlorin gas is thereupon passed through the mixture until the hulls, &c., are completely decolorized and bleached, it being desirable that the mass be kept in agitation while the gas is passing in order that all parts of the mixture may be reacted upon thereby. The chlorin will act on the coloring-matter of both the fiber and the seed-shell particles, as well as upon the alkali, it being therefore present during the decolorizing process in a nascent state. With the alkali the chlorin forms a soluble compound, which with other soluble matter may, if desired, be removed before the subsequent "souring" operation by removing the liquid from the bleached product and thoroughly washing the latter with water. The next step in the treatment involves the subjection of the chlorin-impregnated mass to a reagent or reagents capable of forming, with the excess chlorin present, an inert compound without effecting during the reaction or resulting thereafter in a permanent return of objectionable discoloration. Such a reagent is oxalic acid, and if this be used the bleached hulls are next thoroughly mixed with a solution of the acid and left for a period of thirty minutes to an hour, after which the mass is thoroughly washed with water, yielding the finished product. This is drained and may afterward be dried or not, as desired.

Instead of the oxalic-acid treatment the hulls after bleaching may be first mixed with a one-quarter-of-one-per-cent. solution of ammonium and then with a one-quarter-of-one-per-cent. solution of carbonate of soda.

The strengths of solutions given have been found to yield good results in practice, although, of course, I do not limit myself to the exact percentages specified. Moreover, while solutions of the specified strengths have been used for the treatment of cotton-seed hulls with the result of obtaining a clear white highly-absorbent fiber free from spots and discoloration in the event of employing vegetable materials or fiber of other characters experience has demonstrated that the percentages specified should be somewhat modified to secure the best and most commercially satisfactory product.

Having thus described my invention, I claim—

1. That process of treating cotton-seed hulls, cotton-waste, &c., which consists in first subjecting the same to an alkaline reagent; in then acting upon the material with chlorin gas in the presence of a free alkali; and in finally subjecting the chlorin-impregnated material to a reagent of the character specified.

2. That process of treating cotton-seed hulls, cotton-waste, &c., which consists in first subjecting the same to an alkaline solution and afterward washing the material; in then acting upon the material with chlorin gas in the presence of a free alkali; and in finally subjecting the chlorin-impregnated material to a reagent of the character specified.

3. That process of treating cotton-seed hulls, cotton-waste, &c., which consists in first subjecting the same to an alkaline solution and during such treatment passing steam through the mixture and thereafter washing the material; in then acting upon the material with chlorin gas in the presence of a free alkali; and in finally subjecting the chlorin-impregnated material to a reagent of the character specified.

4. That process of treating cotton-seed hulls, cotton-waste, &c., which consists in first subjecting the same to an alkaline solution and afterward washing the material; in then acting upon the material with chlorin gas in the presence of a free alkali; and in finally subjecting the chlorin-impregnated material to the action of oxalic acid.

5. That process of treating cotton-seed hulls, cotton-waste, &c., which consists in first subjecting the same to an alkaline solution and during such treatment passing steam through the mixture and thereafter washing the material; and in then acting upon the material with chlorin gas in the presence of a free alkali; and in finally subjecting the chlorin-impregnated material to the action of oxalic acid.

6. That process of treating cotton-seed hulls, cotton-waste, &c., which consists in first subjecting the same to an alkaline solution and during such treatment passing steam through the mixture and afterward washing the material; in then reacting upon the material with chlorin gas in the presence of a free alkali; and in finally subjecting the chlorin-impregnated material to the action of oxalic acid and afterward washing the material to obtain the finished product.

7. That process of treating cotton-seed hulls which consists in first grinding the hulls; in then subjecting the same while in a comminuted condition to an alkaline reagent; in then pouring off the liquid and washing the mass; in then adding to the mass an alkali solution and passing chlorin gas into the mixture during the agitation of the latter until the mass is decolorized and bleached; in then pouring off the liquid and washing the bleached mass; in then subjecting the chlorin-impregnated mass to a reagent capable of reacting with the excess chlorin present with the result specified; and in finally washing and draining the mass.

8. That process of treating cotton-seed hulls which consists in first grinding the hulls; in subjecting the same while in a comminuted condition, to an alkaline reagent; in agitating the alkali-treated material and acting thereupon with chlorin gas in the presence of a free alkali; and in finally subjecting the chlorin-impregnated material to a reagent capable of reacting with the excess chorin present with the result specified.

9. That process of treating cotton-seed hulls which consists in first grinding the hulls; in subjecting the ground and comminuted hulls to a one to two per cent. alkali solution and during such subjection passing live steam into the mixture, in removing the dissolved and soluble matter by pouring off the liquid and washing the mass; in then adding to the mass a one-per-cent. alkali solution and passing chlorin gas into the mixture during the agitation of the latter until the mass is decolorized and bleached; in removing the dissolved and soluble material by pouring off the liquid and washing the bleached mass; in subjecting the chlorin-impregnated mass to a reagent capable of reacting with the excess chlorin present with the result specified; and in finally washing the mass with water.

HENRY F. BOCKMEYER.

Witnesses:
JOHN SCANLIN,
ADAM C. STEER.